(12) United States Patent
Hirabayashi et al.

(10) Patent No.: US 7,209,315 B2
(45) Date of Patent: Apr. 24, 2007

(54) MAGNETIC RECORDING AND REPRODUCTION APPARATUS

(75) Inventors: Koichiro Hirabayashi, Osaka (JP); Hiroshi Kanchiku, Nara (JP); Takefumi Yanagihara, Ehime (JP)

(73) Assignee: Matsushita Electrics Industrial Co., Ltd., Kadoma (JP)

( * ) Notice: Subject to any disclaimer, the term of this patent is extended or adjusted under 35 U.S.C. 154(b) by 469 days.

(21) Appl. No.: 10/804,621

(22) Filed: Mar. 19, 2004

(65) Prior Publication Data
US 2004/0207947 A1    Oct. 21, 2004

(30) Foreign Application Priority Data
Mar. 20, 2003    (JP) .............................. 2003-078009

(51) Int. Cl.
*G11B 5/027* (2006.01)
(52) U.S. Cl. ........................................................ 360/85
(58) Field of Classification Search ..................... None
See application file for complete search history.

(56) References Cited

U.S. PATENT DOCUMENTS 5,638,231 A * 6/1997 Okuda et al. ................. 360/85
6,172,840 B1 * 1/2001 Konishi et al. ............... 360/85

* cited by examiner

*Primary Examiner*—William J. Klimowicz
*Assistant Examiner*—Mark Blouin
(74) *Attorney, Agent, or Firm*—Renner, Otto, Boisselle & Sklar, LLP

(57) ABSTRACT

A magnetic recording and reproduction apparatus includes a pivotable arm section; an arm pivoting center shaft for supporting the pivoting center of the arm section; a capstan section for driving a magnetic tape so as to run; a pinch roller provided on the arm section for pressing the magnetic tape to the capstan section; and an extendable and compressable section extendable so as to be wound around the arm pivoting center shaft in accordance with the pivoting of the arm section and compressable so as to retract from the arm pivoting center shaft in accordance with the pivoting of the arm section.

5 Claims, 6 Drawing Sheets

MAGNETIC RECORDING AND REPRODUCTION APPARATUS

This non-provisional application claims priority under 35 U.S.C., §119(a), on Patent Application No. 2003-078009 filed in Japan on Mar. 20, 2003, the entire contents of which are hereby incorporated by reference.

BACKGROUND OF THE INVENTION

1. Field of the Invention

The present invention relates to a magnetic recording and reproduction apparatus which has a reduced size with a simple structure.

2. Description of the Related Art

Recently, the reduction of the weight, production cost and power consumption of magnetic recording and reproduction apparatuses has become desirable.

Hereinafter, a conventional magnetic recording and reproduction apparatus will be described.

A conventional magnetic recording and reproduction apparatus as described in Japanese Laid-Open Publication No. 11-273184 is known.

The above-mentioned magnetic recording and reproduction apparatus has the following problem. As shown in FIGS. 13 through 17 of Japanese Laid-Open Publication No. 11-273184, the pivoting range of a pinch arm 53 is large, and a tension spring 58 extends and compresses, and moves right and left in a large area in accordance with the movement of the pinch arm 53. Therefore, the tension spring 58 occupies quite a large area when in operation, which hinders size reduction of the magnetic recording and reproduction apparatus.

SUMMARY OF THE INVENTION

A magnetic recording and reproduction apparatus according to the present invention includes a pivotable arm section; an arm pivoting center shaft for supporting the pivoting center of the arm section; a capstan section for driving a magnetic tape so as to run; a pinch roller provided on the arm section for pressing the magnetic tape to the capstan section; and an extendable and compressable section extendable so as to be wound around the arm pivoting center shaft in accordance with the pivoting of the arm section and compressable so as to retract from the arm pivoting center shaft in accordance with the pivoting of the arm section.

In one embodiment of the invention, the magnetic recording and reproduction apparatus further includes a pressure-contact section provided on the pivoting center of the arm section, the pressure-contact section being pressure-contactable to the arm section so as to press the magnetic tape to the capstan section. The extendable and compressable section is extendable so as to be wound around the pressure-contact section in accordance with the pivoting of the arm section and is compressable so as to retract from the pressure-contact section in accordance with the pivoting of the arm section.

In one embodiment of the invention, the magnetic recording and reproduction apparatus further includes a chassis section accommodating the arm pivoting center shaft. One end of the extendable and compressable section is connected to the chassis section, and another end of the extendable and compressable section is connected to the arm section.

In one embodiment of the invention, the extendable and compressable section exerts a force on the arm section for pulling the arm section in such a direction so as to separate the pinch roller from the capstan.

In one embodiment of the invention, the extendable and compressable section is a tension coil spring, and the pressure-contact section is a twisted coil spring.

In a magnetic recording and reproduction apparatus according to the present invention, the return spring for the pinch roller arm is extended in an arc along the outer circumference of the contact-pressure spring. Owing to this structure, the return spring can be provided in a very small space.

Thus, the invention described herein makes possible the advantages of providing a magnetic recording and reproduction apparatus having a reduced size.

These and other advantages of the present invention will become apparent to those skilled in the art upon reading and understanding the following detailed description with reference to the accompanying figures.

DESCRIPTION OF THE PREFERRED EMBODIMENTS

A magnetic recording and reproduction apparatus according to the present invention includes a rotatable capstan shaft for transporting a magnetic tape; a pinch roller to be pressed to the capstan shaft to sandwich the magnetic tape with the capstan shaft; a pinch arm section pivotably supporting the pinch roller; a chassis section for pivotably supporting the pinch arm section; a pressure-contact spring section provided so as to be pivotable about the pivoting center shaft of the pinch arm section, thus pressure-contacting the pinch roller to the capstan shaft; and a return spring extended between the pinch arm section and the chassis section for separating the pinch roller away from the capstan shaft. The return spring is extendable in an arc along the outer circumference of the pressure-contact section. Thus, the return spring can be provided in a very small space.

Also according to the present invention, the pressure-contact spring is a twisted coil spring, and the return spring is a tension coil spring. The return spring can be provided in a very small space, and the noise generated by the extension and compression of the return spring can be reduced.

Hereinafter, the present invention will be described by way of illustrative examples with reference to the FIGS. 1 through 6.

Figure 1:
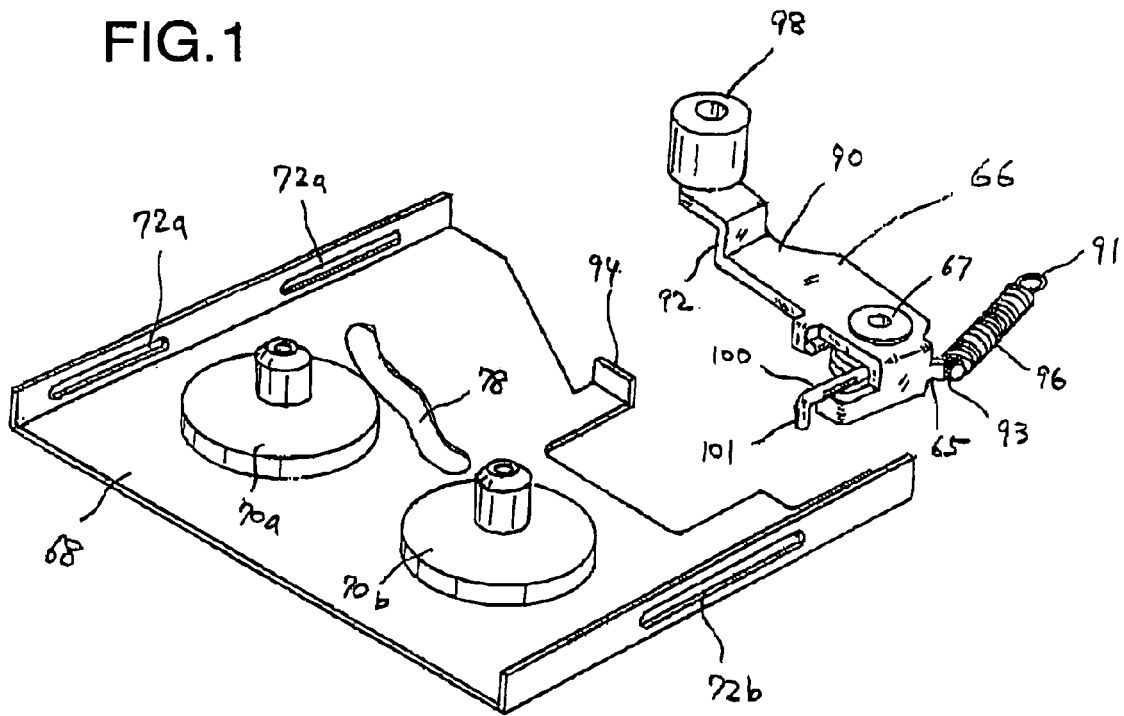
FIG. 1 shows a partial isometric view of a magnetic recording and reproduction apparatus in one example according to the present invention.
Figure 1:
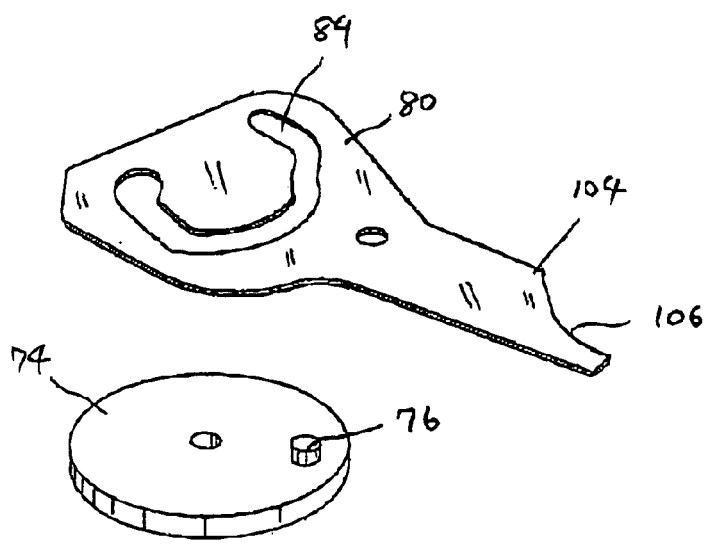
Figure 2:
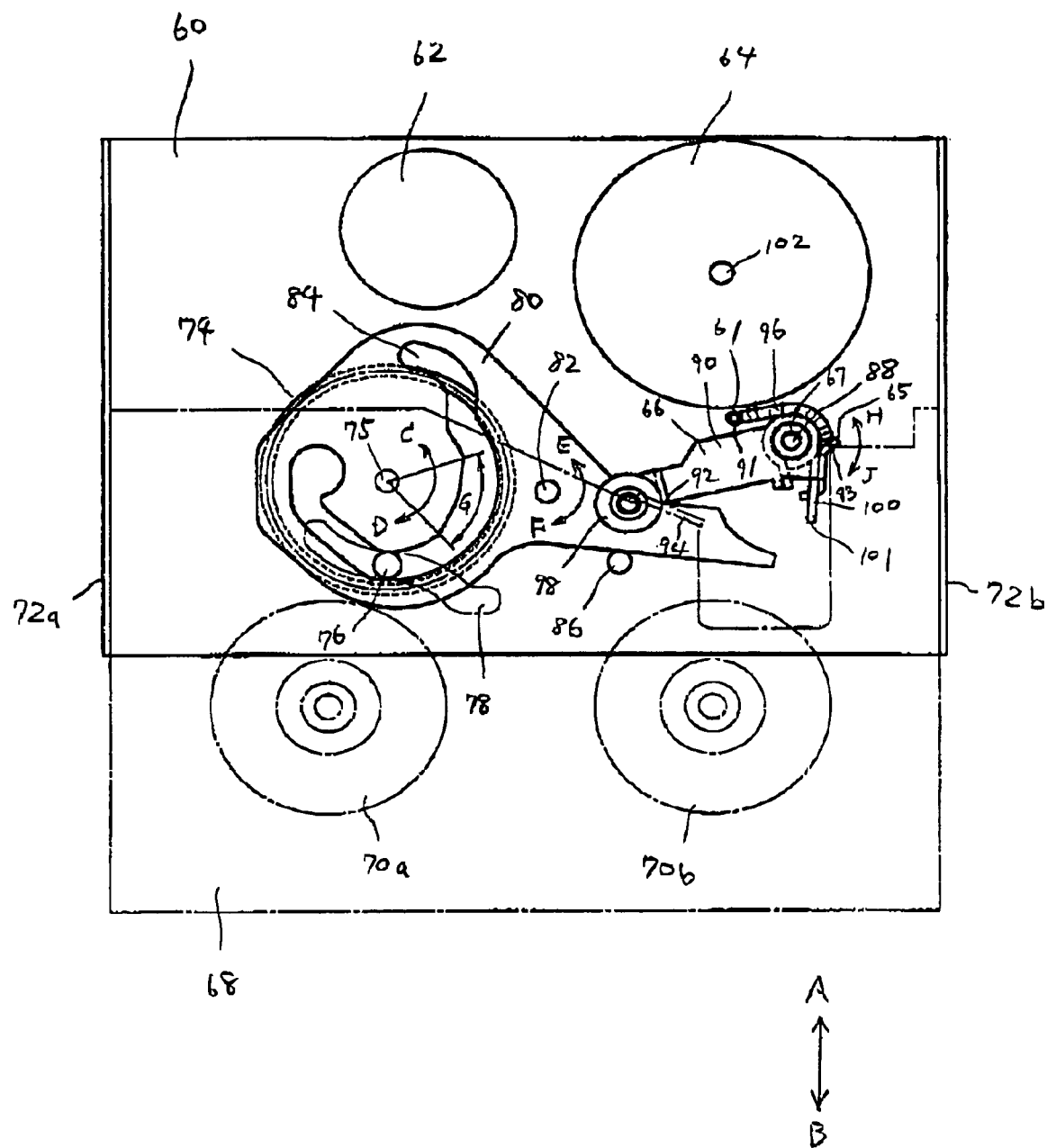
FIGS. 2 through 6 are each a partial plan view of the magnetic recording and reproduction apparatus illustrating an operation thereof.

FIGS. 1 and 2 show a structure of a shrink mechanism of a magnetic recording and reproduction apparatus according to the present invention.

In the shrink mechanism, a movable chassis referred to as a sub chassis moves with respect to the main chassis. When the magnetic recording and reproduction apparatus is in the state of allowing a magnetic tape cassette to be mounted thereon or taken out therefrom, the sub chassis projects from the main chassis. When the magnetic recording and reproduction apparatus operates after tape loading, the sub chassis retracts so as to be substantially nested in the main chassis.

The main chassis accommodates components such as a tape guide drum, a capstan motor, a pinch roller and the like, and the sub chassis accommodates reel stands, a cassette holder, a tape pull-out post and the like.

In FIGS. 1 and 2, some of the components are omitted for simplicity.

A structure and an operation of the magnetic recording and reproduction apparatus will be described.

Reference numeral 60 represents a main chassis (chassis section). The main chassis 60 accommodates a tape guide drum 62, a capstan motor 64, a pinch roller unit 66, and the like which are required for tape running.

Reference numeral 68 represents a sub chassis. The sub chassis 68 accommodates two reel stands 70a and 70b, a cassette holder (not shown) and the like. On the sub chassis 68, a magnetic tape cassette (not shown) is mountable.

The sub chassis 68 is supported by the main chassis 60 via guide sections 72a and 72b, and are relatively movable in directions represented by arrows A and B.

A cam gear 74 is provided on the main chassis 60 and is pivotable in directions represented by arrows C and D about a cam gear shaft 75 by a motor (not shown).

A cam pin 76 is provided on a top surface of the cam gear 74 and is engageable with a cam portion 78 provided in the sub chassis 68.

Owing to this engagement, the sub chassis 68 is movable in the direction of arrow A or B in accordance with the pivoting of the cam gear 74.

The cam gear 74 has a contact (not shown) for detecting a pivoting angle thereof, such that the position of the cam pin 76 can be found.

In the state of FIG. 2, the sub chassis 68 has moved to the utmost position in the direction of arrow B.

A kick arm 80 is provided between the cam gear 74 and the sub chassis 68. The kick arm 80 is pivotably supported by an arm shaft 82 provided on the main chassis 60. A cam groove 84 of the kick arm 80 is in engagement with the cam pin 76.

The kick arm 80 moves In association with the movement of the cam pin 76, and pivots about the arm shaft 82 in a direction represented by arrow E or F at the timing which is determined by the shape of the cam groove 84.

Reference numeral 86 represents a stopper pin, which restricts the pivoting of the kick arm 80 in the direction of arrow F.

A pinch roller unit 66 includes a pivotable pinch roller arm 90 (arm section) and a pinch roller 98, an axis of which is supported by the pinch roller arm 90. The pinch roller unit 66 has a boss 67 at the pivoting center thereof.

The pinch roller arm 90 supports a pressure-contact spring 100 (pressure-contact section) in a flexible state around an outer circumference of the boss 67. The pivoting center of the pinch roller arm 90 is supported by a pinch roller pivoting shaft 88 (arm pivoting center shaft). The pressure-contact spring 100 is, for example, a twisted coil spring.

A tip portion 101 of the pressure-contact spring 100 is bent at a right angle and is engageable with a kick portion 104 of the kick arm 80.

A spring hanger 65 is provided on the pinch roller arm 90 in the vicinity of the boss 67. On the spring hanger 65 hangs a hook 93 of a return spring 96 (extendable and compressable section). The return spring 96 is, for example, a tension coil spring.

The return spring 96 is extended so as to be wound around the pinch roller pivoting shaft 88 in accordance with the pivoting of the pinch roller arm 90, and is compressed so as to retract from the pinch roller pivoting shaft 88 also in accordance with the pivoting of the pinch roller arm 90. The return spring 96 acts on the pinch roller arm 90 so as to pull the pinch roller arm 90 in such a direction so as to separate the pinch roller 98 from a capstan shaft 102 (capstan section).

A hook 91 at the other end of the return spring 96 is in engagement with a spring hanger 61 (FIG. 2) provided on the main chassis 60. This engagement can be achieved in the state where the pinch roller unit 66 is outserted into the pinch roller pivoting shaft 88.

The spring hanger 61 is provided at such a position that the return spring 96 is extended in an arc around an outer periphery of the pressure-contact spring 100.

In this example, the two ends of the return spring 96 are hung on the spring hangers 93 and 61. Alternatively, one end of the return spring 96 may be connected to the pinch roller arm 90 in any other manner, and the other end of the return spring 96 may be connected to the main chassis 60 in any other manner.

The pressure-contact spring 100 is a pressure-contact section which is pressure-contactable to the pinch roller arm 90 so as to press the magnetic tape to the capstan section. As described above, the pressure-contact spring 100 is provided around the pinch roller pivoting shaft 88. In this case, the return spring 96 is extended so as to be wound around the pressure-contact spring 100 in accordance with the pivoting of the pinch roller arm 90, and is compressed so as to retract from the pressure-contact spring 100 also in accordance with the pivoting of the pinch roller arm 90.

A bent portion 92 of the pinch roller arm 90 is located so as to face a bent portion 94 of the sub chassis 68.

An operation of the magnetic recording and reproduction apparatus will be described with reference to FIGS. 2 through 6.

Figure 3:
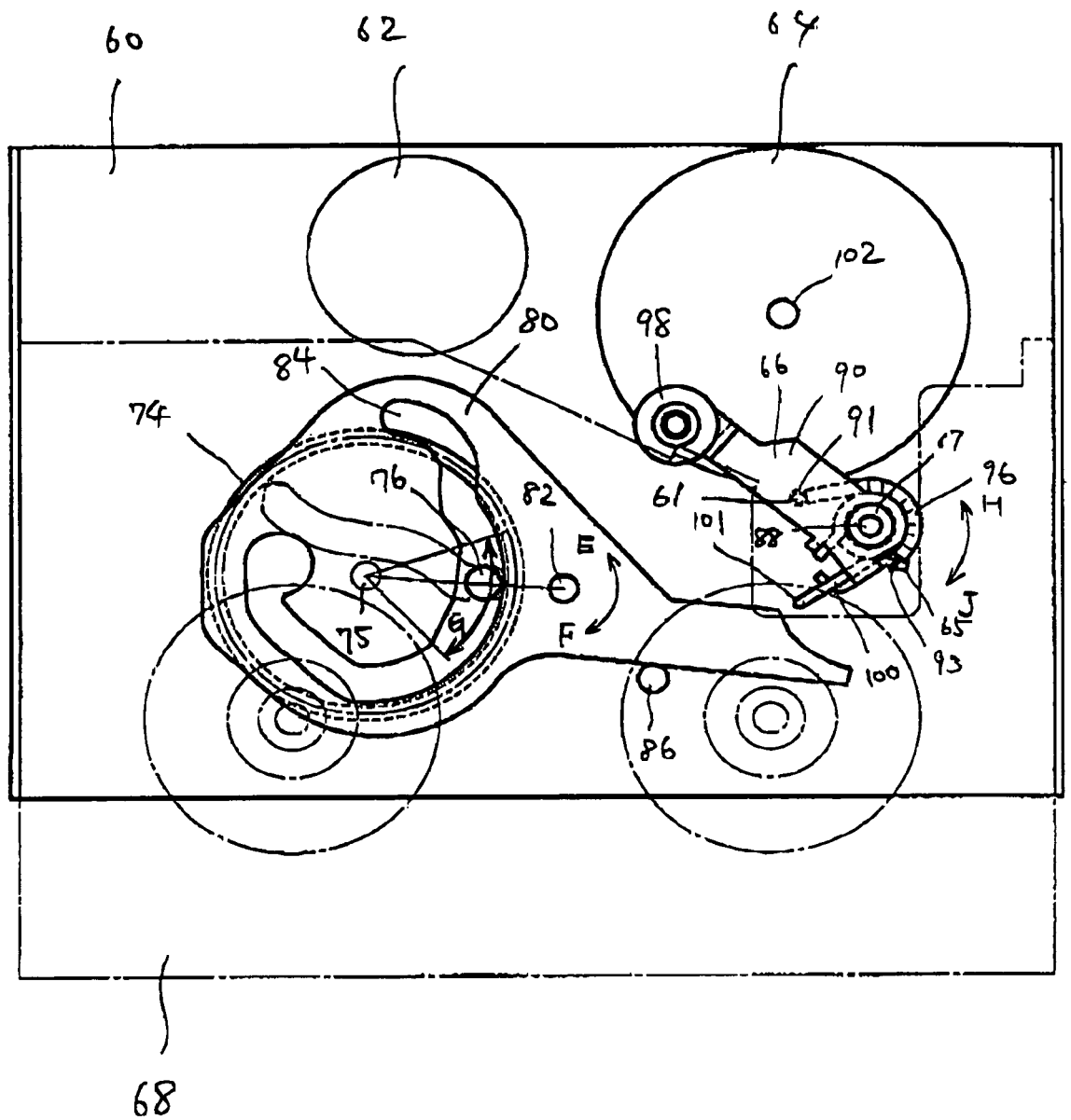

When the cam gear 74 pivots from the state in FIG. 2 in the direction of arrow C, the sub chassis 68 moves in the direction of arrow A by the engagement of the cam pin 76 and the cam groove 84 as shown in FIG. 3.

At this point, the bent portion 92 of the pinch roller arm 90 is pressed by the bent portion 94 of the sub chassis 68. Thus, the pinch roller unit 66 pivots in a direction represented by arrow J against the force of the return spring 96 providing a pivoting torque in a direction represented by arrow H.

The distance between the hook 91 and the hook 93 of the return spring 96 are increased as the pinch roller arm 90 pivots in the direction of arrow J, and thus the return spring 96 is extended. The area occupied by the return spring 96 can be very small although the angle over which the return spring 96 is wound around the pressure-contact spring 100 is increased.

Figure 4:
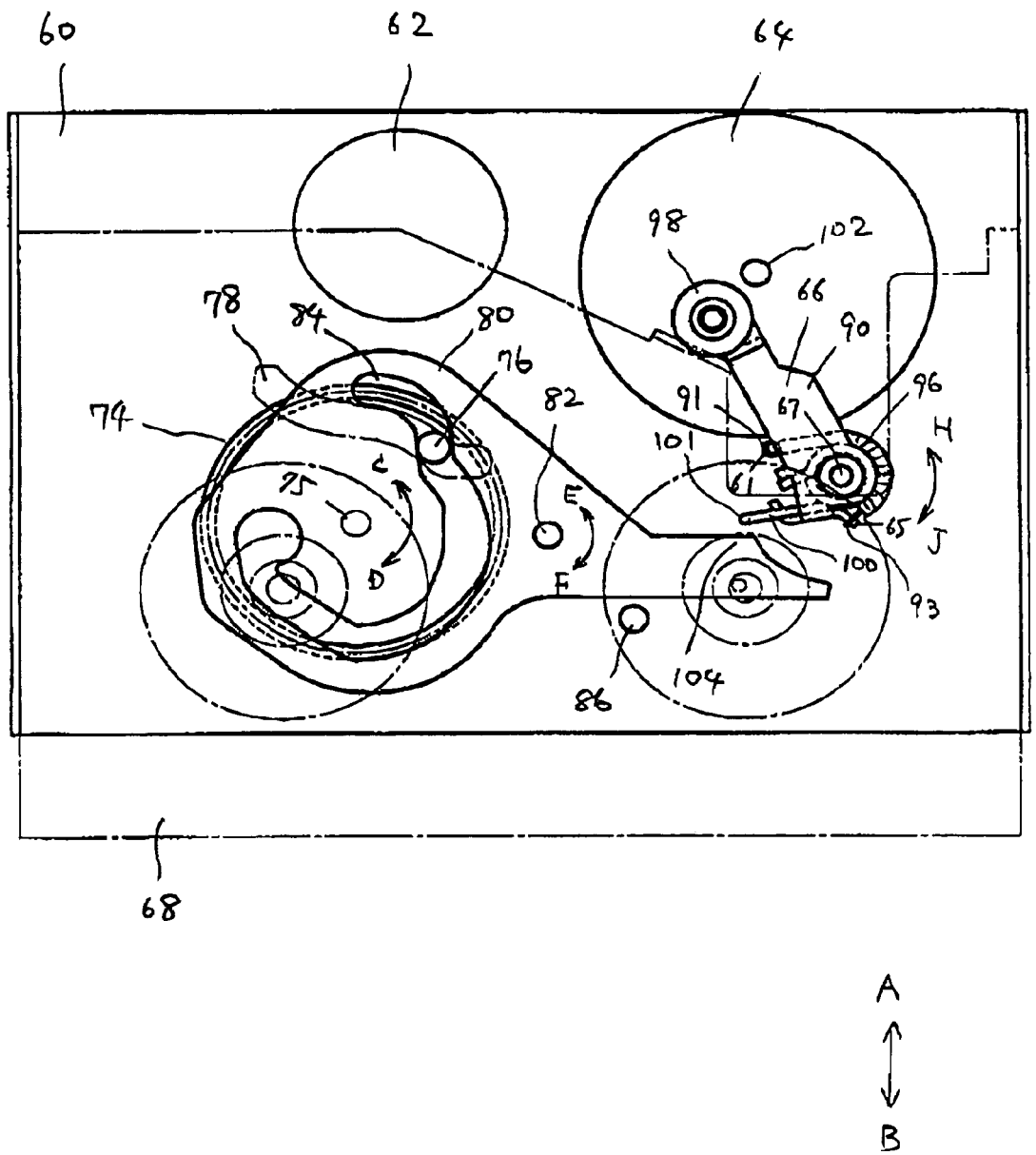

When the cam gear 74 further pivots in the direction of arrow C to the position shown in FIG. 4, the sub chassis 68 stops moving in the direction of arrow A. After this, the sub chassis 68 does not move owing to the shape of the cam portion 78.

In this state, the pinch roller unit 66 is at a stop position where the pinch roller 98 is in a wait state at a position which is a slight distance from the capstan shaft 102.

When the cam gear 74 further pivots in the direction of arrow C, the kick arm 80 pivots in the direction of arrow E owing to the shape of the cam groove 84 while the sub chassis 68 is paused.

As a result, the kick portion 104 of the kick arm 80 is engaged with the tip portion 101 of the pressure-contact spring 100, thereby pivoting the pinch roller unit 66 in the direction of arrow J. Even after the pinch roller 98 contacts the capstan shaft 102, the pinch roller unit 66 still pivots. This operation causes an end portion of the pressure-contact spring 100 to flex, generating a pressure-contact force in the pinch roller 98. Thus, the magnetic recording and reproduction apparatus is placed into play mode shown in FIG. 5.

In this state, the pinch roller 98 presses the magnetic tape (not shown) to the capstan shaft 102 for driving the magnetic tape so as to run. Thus, the magnetic tape sandwiched between the pinch roller 98 and the capstan shaft 102 is transported by the rotation of the capstan motor 64.

The cam groove 84 of the kick arm 80 is a positive motion cam having a width which is substantially equal to the outer diameter of the cam pin 76, except for a portion thereof represented by letter G (FIG. 2). The portion G has a wider width for the following reason.

While the cam pin 76 is outside the portion G (FIGS. 2, 4 and 5), the pressure angle between the cam pin 76 and the cam groove 84 does not hinder any movement of the cam pin 76 in the cam groove 84. While the cam pin 76 is in the portion G, the pressure angle between the cam pin 76 and the cam groove 84 is very large. Especially in the state shown in FIG. 3 where the cam gear shaft 75, the cam pin 76 and the arm shaft 82 are arranged in a straight line, the pressure angle is 90 degrees. The width of the portion G is slightly wider than the rest of the cam groove 84 in order to prevent the cam pin 76 from being immovably stuck in the cam groove 84.

While the cam pin 76 is in the portion G, the kick arm 80 is movable in the directions of arrows E and F about the arm shaft 82, except that the movement in the direction of arrow P is restricted by the stopper pin 86.

Figure 5:
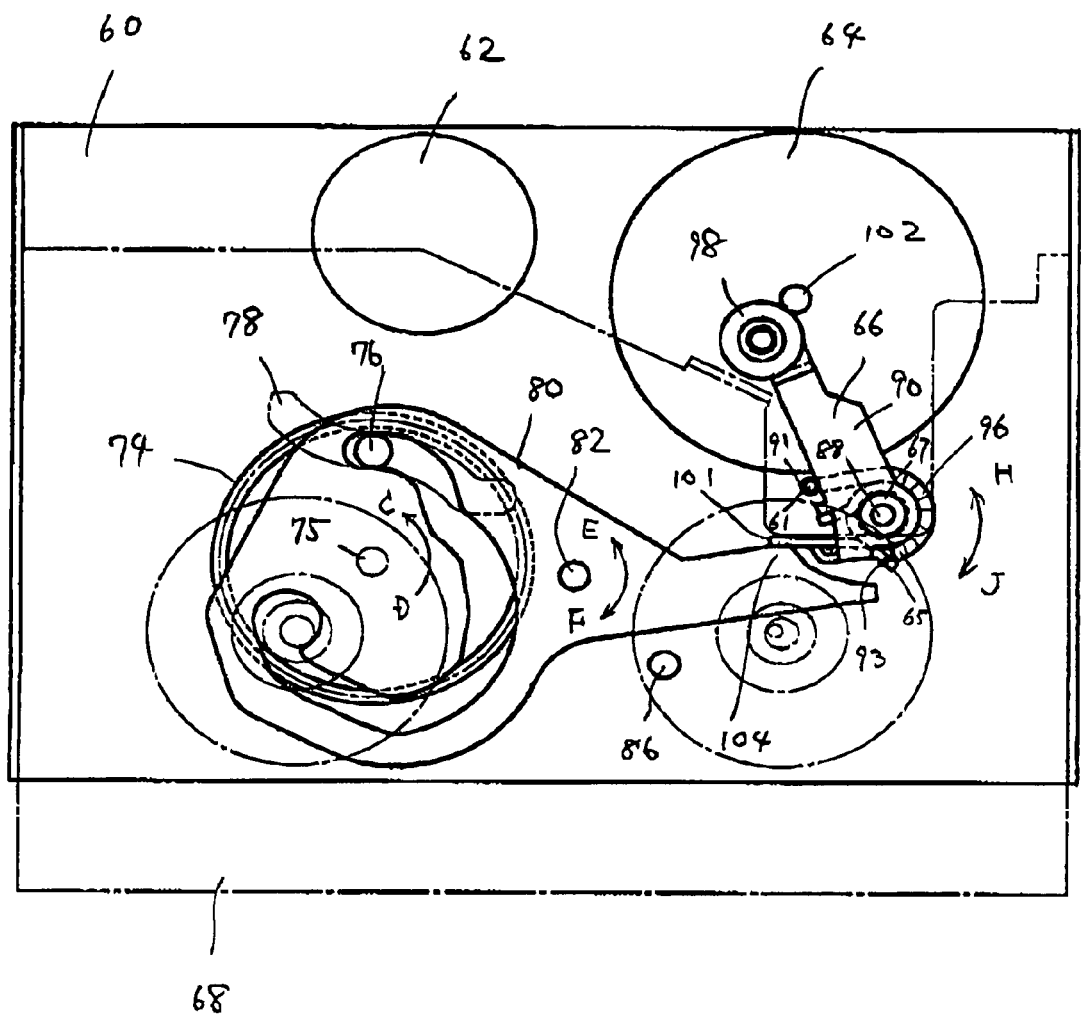

The kick arm 80 needs to be pivotable in the direction of arrow E until the magnetic recording and reproduction apparatus is placed into play mode shown in FIG. 5. However, if the kick arm 80 was excessively pivoted in the direction of arrow E in the state shown in FIG. 3, the pressure angle between the cam pin 76 and the cam groove 84 would become too large to place the kick arm 80 into a self-locked state.

Figure 6:
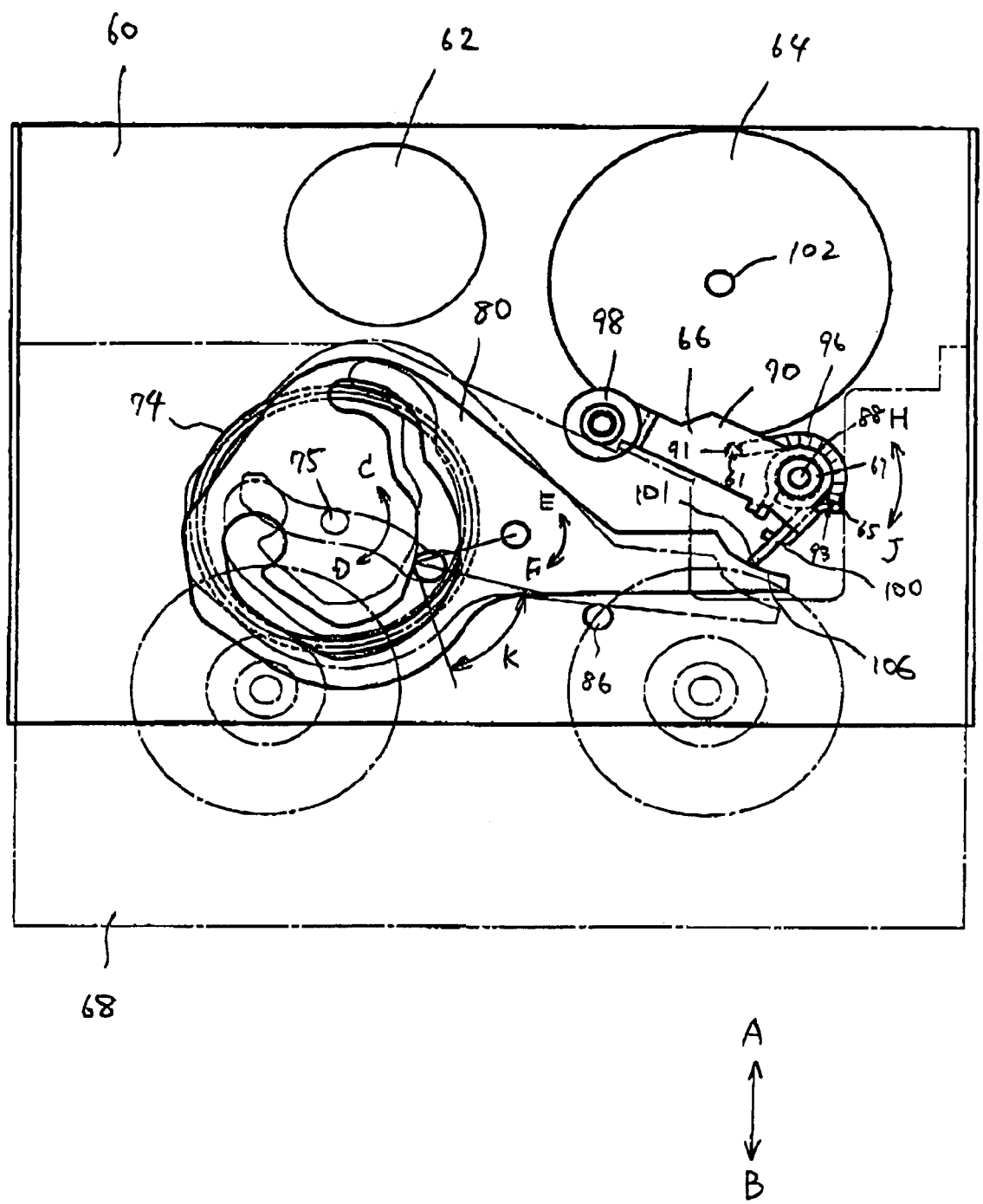

In order to restrict the pivoting of the kick arm 80 in the direction of arrow E, the kick arm 80 has a pivoting stop portion 106 (FIG. 1). While the tip portion 101 of the pressure-contact spring 100 of the pinch roller unit 66 moves facing the pivoting stop portion 106, the pivoting of the kick arm 80 in the direction of arrow E is restricted, Therefore, as shown in FIG. 6, the kick arm 80 can only move between the position represented by the one-dot chain line and the position represented by the solid line. As a result, the pressure angle between the cam pin 76 and the cam groove 84 is as presented by letter K in FIG. 6. Thus, the self-lock state of the kick arm 80 is not generated.

The pivoting stop portion 106 is provided so as to cover the area of movement of the tip portion 101 of the pressure-contact spring 100 while the cam pin 76 moves in the portion G. The pivoting of the kick arm 80 is restricted by stopper pin 86 and the tip portion 101 of the pinch roller unit 66.

As described above, in a magnetic recording and reproduction apparatus according to the present invention, the extendable and compressable section extends so as to be wound around the arm pivoting center shaft in accordance with the pivoting of the arm section, and compresses so as to retract from the arm pivoting center shaft in accordance with the pivoting of the arm section.

Since the extendable and compressable section is extendable in accordance with the pivoting of the arm section with no need to pivot the extendable and compressable section, no extra area is necessary for accommodating the pivoting of the extendable and compressable section. Thus, the size of the magnetic recording and reproduction apparatus can be reduced.

As described above, according to the present invention, even when the return spring 96 is extended in accordance with the pivoting of the pinch roller arm 90, the area occupied by the return spring 96 is very small; although the angle over which the return spring 96 is wound around the pressure-contact spring 100 is enlarged. This significantly reduces the size of the magnetic recording and reproduction apparatus.

In general, an outer circumference of a spring is smooth. The outer circumference of the return spring 96 is always in contact with the pressure-contact spring 100. The return spring 96 does not cause any large noise when rapidly extended or compressed. This prevents the magnetic recording and reproduction apparatus from generating a disturbing noise.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
   a pivotable arm section;
   an arm pivoting center shaft for supporting the pivoting center of the arm section;
   a capstan section for driving a magnetic tape so as to run;
   a pinch roller provided on the arm section for pressing the magnetic tape to the capstan section; and
   an extendable and compressable section extendable so as to be wound around the arm pivoting center shaft in accordance with the pivoting of the arm section and compressable so as to retract from the arm pivoting center shaft in accordance with the pivoting of the arm section.

2. A magnetic recording and reproduction apparatus according to claim 1, further comprising a pressure-contact section provided on the pivoting center of the arm section, the pressure-contact section being pressure-contactable to the arm section so as to press the magnetic tape to the capstan section,
   wherein the extendable and compressable section is extendable so as to be wound around the pressure-contact section in accordance with the pivoting of the arm section and is compressable so as to retract from the pressure-contact section in accordance with the pivoting of the arm section.

3. A magnetic recording and reproduction apparatus according to claim 1, further comprising a chassis section accommodating the arm pivoting center shaft,
   wherein one end of the extendable and compressable section is connected to the chassis section, and another end of the extendable and compressable section is connected to the arm section.

4. A magnetic recording and reproduction apparatus according to claim 1, wherein the extendable and compressable section exerts a force on the arm section for pulling the arm section in such a direction as to separate the pinch roller away from the capstan.

5. A magnetic recording and reproduction apparatus according to claim 2, wherein the extendable and compressable section is a tension coil spring, and the pressure-contact section is a twisted coil spring.

* * * * *